Figures 1, 2:
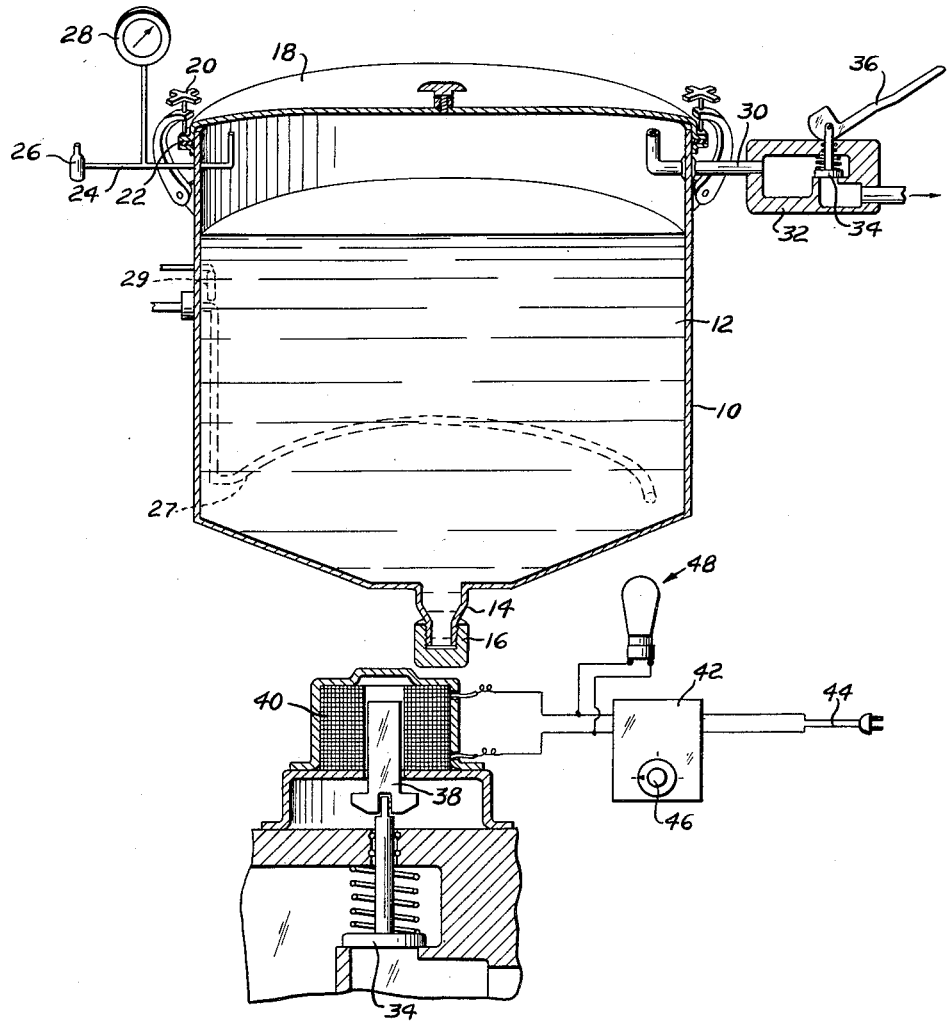

Jan. 22, 1957 C. WAGNER 2,778,736
METHOD OF DEEP FAT COOKING FOODS UNDER PRESSURE
Filed April 9, 1954

INVENTOR.
CHESTER WAGNER
BY
ATTORNEYS

2,778,736

METHOD OF DEEP FAT COOKING FOODS UNDER PRESSURE

Chester Wagner, Eaton, Ohio

Application April 9, 1954, Serial No. 422,148

3 Claims. (Cl. 99—1)

This invention relates to a method and apparatus for cooking, particularly for deep fat frying.

Ordinary methods of deep fat frying, as practiced at the present time, involve the heating of a frying fat or oil to a predetermined temperature, and the foods to be cooked are then immersed in the heated fat or oil for a predetermined time.

This method of cooking is generally satisfactory if all of the important factors are maintained within relatively close limits. However, for producing large volumes of food rapidly, as is necessary in a restaurant, this method is too time consuming, with the result that during a rush period the foods may not be properly cooked.

Having the foregoing in mind, a primary object of the present invention is to provide a modified method of cooking food by frying in deep fat, which has the advantage of more rapid production.

Another object of this invention is to provide a method of deep fat cooking of foods in which the variable factors contributing to the quality of the cooked food are controlled within extremely close limits, thereby providing for controlled quality in the food.

A still further object of this invention is to provide a method of deep fat frying in which there is less shrinkage of the food being cooked and in which even large pieces of food will be cooked completely through in a minimum length of time.

A still further object of this invention is to provide a method of deep fat frying in which the fat comsumption is held to a minimum thereby providing an economical process for use in restaurants.

A particular object of this invention is to provide a method of deep fat frying which is rapid and by means of which a superior product results.

These and other objects and advantages will become more apparent upon reference to the following description taken in connection with the accompanying drawings, in which:

Figure 1 is a diagrammatic perspective view of a cooker according to this invention adapted for carrying out the method thereof; and Figure 2 is a fragmentary view showing the manner in which the quick release valve of Figure 1 can be automatically operated.

Referring to the drawings somewhat in more detail, 10 indicates a container adapted for receiving a quantity of fat or oil 12 in which foods are to be cooked. The container has a drain fitting 14 having a detachable cap 16.

The upper end of the container is open and is adapted for being closed by a lid 18, which can be secured in place by the clamp means 20 with a gasket 22 being provided to provide a tight seal between the lid and the container.

When the lid 18 is mounted on the container, the arrangement is that of a pressure cooker and, accordingly, there is provided a conduit 24, including a relief valve 26, and a pressure gauge 28 which are customary auxiliaries to be employed in connection with pressure cookers for the purpose of safety and for the purpose of determining the pressure within the cooker. Heating means 27 and thermostatic control means 29 also form a part of the cooker.

According to the present invention I also provide a pressure release conduit 30 leading from the interior of container 10 to the body of a fast acting release valve 32, which is normally closed by a valve member 34, with the valve member being adapted for being lifted off its seat by operation of a handle 36.

In practicing the method of the present invention with the apparatus illustrated in Figure 1, the container has placed therein the cooking fat or oil, and this is heated to the desired temperature, say 310° F. to 325° F., by a suitable means, such as a gas flame or by electric heater means. Preferably thermostatic controls, which are well known in the art, are provided for maintaining the temperature of the cooking fat or oil at the proper point.

In cooking, the foods to be cooked are placed in a basket or the like and lowered into the hot cooking fat or oil for a sufficiently long period of time to brown the articles of food to about the desired degree. Thereafter, the lid 18 is placed in position on the container, and the clamp means 20 are operated to provide a tight seal between the lid and the container. The pressure in the container is then run up to about fifteen pounds and maintained at that point for a predetermined length of time, which will vary according to the weight and texture of the foods being fried. After a predetermined interval has elapsed, the handle 36 is operated, which will lift the valve 34, which will quickly release the pressure within container 10, permitting the lid 18 to be removed therefrom immediately, and the cooked articles of food to be taken from the cooking fat or oil.

I have found that by practicing my method in a cooking arrangement of the nature disclosed, I am able to obtain a deeper heat penetration into the articles being cooked, whereby even relatively large pieces of food can quickly be cooked. I find less shrinkage of the articles of food, faster frying thereof, and absolutely uniform controlled quality by controlling the time that the container is retained under pressure. Also, due to the fact that the temperature of the frying fat does not need to be elevated in order to cook large pieces of food or to speed the cooking process, there is considerably less consumption of fat or oil than is the case with ordinary deep fat frying methods.

The time that the container 10 is retained under pressure may advantageously be automatically controlled in accordance with the Figure 2 arrangement, and wherein the valve member 34 is connected with armature 38 arranged to be influenced by a coil 40, that is connected through a timer mechanism 42 with a supply line 44. Timer 42 can be set by knob 46 so that after a predetermined interval a switch within the timer will close, energizing coil 40 and drawing armature 38 and valve member 34 upwardly to release pressure from container 10.

A signalling device, such as the light indicated at 48, can be connected in parallel with coil 40 to give a visible signal to the operator that the cooking process has been completed. The signalling device could equally well be an audible signal in place of or in connection with the visible signal 48.

It will be understood that while I show in the drawings a preferred arrangement consisting of a container adapted for being left open during the initial cooking step and then for being closed during the final cooking step, two containers could be used and satisfactory results obtained by having the first container open and the second container adapted for being closed.

As a specific example of the manner in which my invention is practiced, I find that an average size chicken for frying, say, about one and one-half pounds, can be cooked according to my invention by a preliminary cooking step, with the container open for about two to three minutes with the fat at about 315° F. The second step is carried out by placing the fat under pressure of about 15 pounds and continuing the cooking at about the same temperature for from five to seven minutes.

It will also be understood that while I show the pressure being developed naturally within the cooker by the moisture that is given off from the food being cooked, it is within the scope of my invention to provide a separate source of gas or vapor connected with the container and adapted for being released into the container when the lid thereof is sealed on in order to establish instantaneously the pressure conditions which are described.

It will be appreciated that the final cooking step under pressure does not cause the food to become logged with the cooking fat or oil. Apparently, due to the moisture within the article of food, it appears that the action is actually the opposite with the moisture tending, at least in part, to vaporize thus excluding the fat and oil from the article of food and contributing to the greater degree of fluffiness that I find imparted to food cooked in this manner.

It will be understood that this invention is susceptible to modification in order to adapt it to different usages and conditions and, accordingly, it is desired to comprehend such modifications within this invention as may fall within the scope of the appended claims.

I claim:

1. An improved method of deep fat cooking foods under pressure in a minimum of time which consists of the steps of establishing a bath of hot oil, said bath of oil being heated to about 310° to 325° F., introducing the food to be cooked into said hot bath of oil and allowing it to cook for a time sufficient to brown the food, and thereafter enclosing the same and continuing the cooking while simultaneously maintaining the food in said bath of hot oil and cooking the same under a pressure of up to about 15 pounds per square inch and while thus immersed in said hot oil for a period of time to cook the food.

2. An improved method of deep fat cooking foods under pressure in a minimum of time which consists of the steps of establishing a bath of hot oil, said bath of oil being heated to approximately 310–325° F., introducing the food to be cooked into said hot bath of oil and cooking the same for a time sufficient to brown the food, and thereafter enclosing the same and continuing the cooking while simultaneously maintaining the food in said bath of hot oil and cooking the same under a pressure of about fifteen pounds per square inch and at a temperature of about 315 to 325° F., and continuing the cooking for a period of from 5 to 7 minutes.

3. An improved method of deep fat cooking foods under pressure in a minimum of time which consists of the steps of establishing a bath of hot oil, said bath of oil being heated to approximately 310–325° F., introducing the food to be cooked into said hot bath of oil and cooking it for from two to three minutes, and then enclosing the same and continuing the cooking while simultaneously maintaining the food in said bath of hot oil and cooking the same under a pressure of about fifteen pounds per square inch and at a temperature of about 315 to 325° F. to finish cooking the food, the overall time for the complete cooking operation being approximately ten minutes.

References Cited in the file of this patent
UNITED STATES PATENTS

| | | |
|---|---|---|
| 1,610,564 | McLaughlin | Dec. 14, 1926 |
| 2,218,188 | Wittenberg | Oct. 15, 1940 |
| 2,270,327 | Mills et al. | Jan. 20, 1942 |
| 2,355,150 | Simone | Aug. 8, 1944 |
| 2,472,451 | Whitney | June 7, 1949 |
| 2,532,639 | Payne | Dec. 5, 1950 |
| 2,537,695 | Page | Jan. 9, 1951 |
| 2,546,464 | Martin | Mar. 27, 1951 |
| 2,550,758 | Bemis | May 1, 1951 |
| 2,551,651 | Vandewater | May 8, 1951 |

OTHER REFERENCES

"Pressure Cookery," 1947, by Leone Rutledge Carroll, published by M. Barrows and Company, Inc., New York, page 47, article entitled Pot Roast, Sour; page 50, article entitled Swiss Steak; and page 52, article entitled Barbecued Spareribs.